Aug. 19, 1947.    G. L. MILLER    2,426,040
CHECK VALVE
Filed March 10, 1944

George L. Miller,
INVENTOR.

BY
*Victor J. Evans & Co.*
ATTORNEYS

Patented Aug. 19, 1947

2,426,040

UNITED STATES PATENT OFFICE 2,426,040

CHECK VALVE

George L. Miller, United States Army, Hackensack, N. J.

Application March 10, 1944, Serial No. 525,926

1 Claim. (Cl. 251—119)

My invention relates to valves, and has among its objects and advantages the provision of an improved check valve.

An object of my invention is to provide a check or vacuum valve of novel construction which may be easily attached to a conventional steam radiator air venting valve in lieu of the usual cap, and in which the valve construction is such as to open in response to slight pressure for air venting purposes, but in which the valve seats strongly in response to slight or great external pressure to prevent entry of air into the system.

Figure 1:
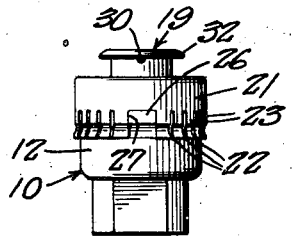
Figure 1 is a side view of the valve.
Figure 2:
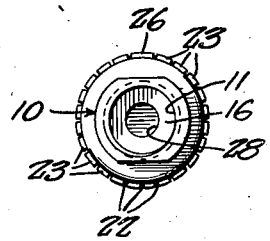
Figure 2 is an end view.

In the embodiment of the invention selected for illustration, I make use of a valve body 10 provided with a threaded bore 11 for connection with a conventional air vent valve of a steam radiator. This body includes an annular wall 12 defining a chamber 13 of larger diameter than the threaded bore 11. The wall 12 is provided with a flat end face 14 constituting a shoulder or support for a flexible diaphragm 15, preferably rubber.

Figure 3:
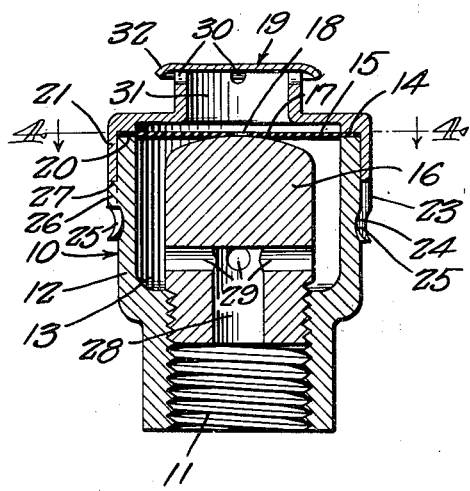
Figure 3 is an enlarged sectional view.
Figure 4:
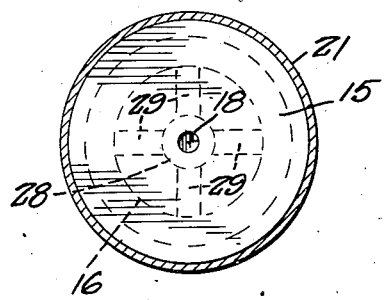
Figure 4 is a sectional view along the line 4—4 of Figure 3.

A seat body 16 is threaded partly in the bore 11 and is provided with a slightly convexed face or seat 17 having its highest point lying substantially flush with the end face 14, so that the diaphragm 15 touches the seat when flat, as in Figure 3. A small air venting opening 18 is provided in the diaphragm 15, which opening is located coaxially of the seat 17 so as to be closed thereby when the diaphragm is in the normal position of Figure 3.

Means for fixedly securing the diaphragm to the valve body 10 comprises a cap 19 having an annular shoulder 20 for clamping the diaphragm to the end face 14. An annular flange 21 is provided on the cap 19 to fit over the open end of the annular wall 12. The flange 21 is slotted axially at 22 to divide part of the flange 21 into cap latching fingers 23 for detachably connecting the cap 19 with the valve body 10. These fingers are flexible and bear against the outer face of the wall 12.

A circumferential groove 24 is provided in the outer face of the wall 12, and the fingers 23 are formed with detents 25 which snap into the groove 24 when the cap 19 is pressed onto the valve body to clamp the diaphragm against the end face 14 to seal the edge margin of the diaphragm. The clamping pressure on the diaphragm is sufficient to prevent slippage between the face 14 and the shoulder 20, but the pressure is not too great, since excessive pressure causes objectionable distortion of the diaphragm.

A lug 26 projects from the outer face of the wall 12 and is receivable in a slot 27 in the flange 21 to restrain the cap 19 from rotation relatively to the wall 12. Because of the lug 26, the cap 19 can be moved axially only on the wall 12, which prevents distortion of the diaphragm incident to any relative rotation of the clamping parts.

The body 16 preferably comprises brass or other suitable material which prevents sticking of the diaphragm 15. An axial passage 28 is made in the body 16, which passage places the bore 11 in communication with the chamber 13 through the medium of branch ports 29 in the body 16. Ports 30 are provided in the cap 19 to place the cap chamber 31 in communication with the atmosphere. A flange 32 on the cap 19 overhangs the ports 30 to act as a duct shield.

The diaphragm 15 is highly sensitive to pressure, so that a slight pressure opens or closes the opening 18, depending upon the direction of the pressure.

All the rigid parts of the valve may comprise metal or plastic, as desired.

Without further elaboration, the foregoing will so fully explain my invention, that others may, by applying current knowledge, readily adapt the same for use under various conditions of service.

I claim:

A check valve of the type described comprising a body having a pressure inlet chamber provided with a shoulder, and a bore of smaller diameter than said chamber for connection with a pressure supply means, a cap having outlet means and a pressure outlet chamber and provided with a second shoulder, a valve seat in said inlet chamber threaded into said bore and provided with a convex face and further provided with ports for placing the bore in communication with said pressure inlet chamber, the shoulder of said pressure inlet chamber lying substantially in a plane at the highest point of said convexed face, a diaphragm having its edge margin positioned between said first and second shoulders and provided with an opening normally closed by the convexed face of said seat, said diaphragm separating said pressure inlet chamber from said pressure outlet chamber, with the two chambers having communication only when said diaphragm is lifted off said seat by pressure in said pressure inlet chamber, a slot in said cap and a lug on said body receivable in the slot whereby the cap and body are limited to relative axial movement, a groove in said body, spring fingers formed on said cap, said fingers having formations thereon pressed into said groove when said cap is pressed home whereby said cap and said body clamp said diaphragm with limited pressure between the first and second shoulders through axial movement of the cap with respect to the diaphragm and body and a circular depending flange formed on said cap to shield said outlet means formed in said cap.

GEORGE L. MILLER.

REFERENCES CITED

The following references are of record in the file of this patent:

UNITED STATES PATENTS

| Number | Name | Date |
|---|---|---|
| 1,762,148 | Amos | June 10, 1930 |
| 445,257 | Beck | Jan. 27, 1891 |
| 1,654,474 | Wolter | Dec. 27, 1927 |
| 2,332,695 | Cantor | Oct. 26, 1943 |
| 1,497,726 | Keenan | June 17, 1924 |
| 1,133,738 | Mintz | Mar. 30, 1915 |
| 213,118 | Locke | Mar. 9, 1879 |
| 1,701,277 | Shindel | Feb. 5, 1929 |

FOREIGN PATENTS

| Number | Country | Date |
|---|---|---|
| 17,325 | Great Britain | Aug. 29, 1901 |
| 278,622 | Italy | Oct. 15, 1930 |